(12) United States Patent
Thompson et al.

(10) Patent No.: US 7,946,138 B2
(45) Date of Patent: May 24, 2011

(54) ADJUSTABLE POSITIONING APPARATUS FOR COOLING MEMBERS

(75) Inventors: Thomas Kent Thompson, Granville, OH (US); Terry Joe Hanna, Millersport, OH (US); Russell D. Arterbum, Athens, TN (US)

(73) Assignee: Johns Manville, Denver, CO (US)

( * ) Notice: Subject to any disclaimer, the term of this patent is extended or adjusted under 35 U.S.C. 154(b) by 898 days.

(21) Appl. No.: 11/369,782

(22) Filed: Mar. 7, 2006

(65) Prior Publication Data

US 2007/0209399 A1    Sep. 13, 2007

(51) Int. Cl.
*C03B 37/02*    (2006.01)

(52) U.S. Cl. ............... 65/510; 65/511; 65/513

(58) Field of Classification Search ........ 65/481, 65/510, 511, 513; 411/353
See application file for complete search history.

(56) References Cited

U.S. PATENT DOCUMENTS

| | | | |
|---|---|---|---|
| 2,544,304 A * | 3/1951 | Eckenbeck et al. .......... 411/180 |
| 2,759,681 A * | 8/1956 | Rissberger, Jr. et al. ... 242/610.6 |
| 2,908,036 A * | 10/1959 | Russell ........................... 65/512 |
| 3,002,226 A * | 10/1961 | Warthen ........................ 65/384 |
| 3,556,570 A * | 1/1971 | Cosenza ...................... 411/176 |
| 4,078,413 A | 3/1978 | McCormick et al. |
| 4,207,086 A | 6/1980 | Heitmann et al. |
| 4,325,722 A * | 4/1982 | Jensen ........................... 65/512 |
| 4,337,075 A | 6/1982 | Mechell et al. |
| 4,397,665 A | 8/1983 | Harris |
| 4,566,890 A * | 1/1986 | Hostler et al. ................ 65/512 |
| 4,566,891 A * | 1/1986 | Briar et al. .................... 65/511 |
| 4,662,922 A | 5/1987 | Hill et al. |
| 5,244,483 A * | 9/1993 | Brosch et al. ................. 65/493 |
| 5,693,118 A * | 12/1997 | Snedden et al. ............... 65/511 |
| 5,749,933 A * | 5/1998 | Ghorpade et al. ............ 65/511 |
| 5,925,164 A * | 7/1999 | Dowlati et al. ............... 65/511 |
| 6,000,116 A * | 12/1999 | Prange .......................... 29/456 |
| 6,196,029 B1 | 3/2001 | Melia et al. |

* cited by examiner

*Primary Examiner* — John Hoffmann (74) *Attorney, Agent, or Firm* — Robert D. Touslee (57) ABSTRACT

An apparatus for adjusting the cooling members located beneath fiberizing bushings is disclosed having the capability of moving each cooling member, or one portion of each cooling member, in a generally vertical direction, and/or in a lateral and/or tilting direction. Also disclosed is a process of using the apparatus to make fibers from molten material including molten glass.

35 Claims, 9 Drawing Sheets

ADJUSTABLE POSITIONING APPARATUS FOR COOLING MEMBERS

The invention involves adjustable apparatus for positioning cooling members beneath a fiberizing bushing, and a method for making fiber from a molten material such as molten glass using this apparatus. More particularly, the present invention involves a bushing apparatus and a method for making fiber that reduces investment while providing a more uniform temperature profile across the orifice plate of the bushing and a better temperature control capability for the operators.

BACKGROUND

In the manufacture of fiber from molten material, such as molten glass, it has been common practice to use a bushing made of precious metals including platinum, rhodium, palladium, ruthenium, iridium and alloys thereof. The bushings are electrically heated by their own resistance and are box-like, open on the top and comprise an orifice plate containing hundreds or thousands of nozzles or tips welded or punched thereon as shown by U.S. Pat. Nos. 4,207,086 and 4,078,413, which disclosures are hereby incorporated by reference.

As the molten material emerges from the orifices or nozzles, a meniscus of molten material is formed below each orifice or tip from which a fiber is pulled continuously. This is the objective, but if the temperature of the meniscus is not carefully controlled, one or more fibers break, requiring a costly stoppage of fiberization from that bushing and a restart of the bushing. To remove the heat that must be removed to cool the molten fiber so that it will have integrity and strength to pull the formed fiber behind, cooling members are located close to the orifices or nozzle tips to remove heat from the meniscus and newly formed fiber. These cooling members can be either cooling tubes like shown in U.S. Pat. Nos. 4,397,665, 5,244,483 and 6,196,029, the disclosures of which are hereby incorporated by reference, or cooling fins as are well known in the fiber industry.

Because it is not possible to maintain a uniform temperature across all of the nozzles or orifices using only the bushing, it is conventional to adjust the cooling tubes or fins individually and as a group to address hot spots, cold corners, and other fiber forming temperature problems. Bushings continue to get larger with thousands of nozzles or orifices creating or exaggerating temperature non-uniformities versus smaller bushings of the past. Past apparatus for adjusting the cooling members has been cumbersome and difficult to position the cooling members precisely to maintain the desired spacing between the cooling members and the tip plate or orifice plate, the tips, the molten glass meniscuses beneath the tips or orifices and the just formed fibers. This spacing is extremely important because at the temperatures the tips and meniscuses are at during fiberization, the heat transfer is dependent upon the square of the separation distance. It is very hot and uncomfortable around the bottom bushing and bushing mounting frame that holds the bushing in place. To insure that the cooling members are optimally positioned, it is important that the adjusting means is easy to use and to quickly and precisely position the cooling members. To achieve accurate positioning in this hot corrosive environment it is also important for the adjusting apparatus to be simple with none or few moving parts. Current adjustable support apparatus exists for adjusting the cooling members vertically, but is severely lacking in the these requirements and in enabling adjustment of the each tube laterally towards or away from the exit end of the tips and the meniscus.

SUMMARY

The invention comprises an apparatus for supporting and permitting adjustment of the position of cooling members mounted close to the tips or orifice plate of a fiberizing bushing to enable the desired spacing between the cooling members and the tips, meniscuses and/or fibers to be achieved and maintained. The apparatus comprises a bushing having cooling members that can be adjusted vertically, laterally and by tilt angle wherein each cooling member is supported by one or more generally vertical rods (generally vertical when the bushing assembly is first assembled) that can be moved to adjust the cooling member generally vertically and that can be moved laterally and/or easily bent to move the cooling member generally laterally and/or to give the cooling member a tilt angle or to change the tilt angle. By generally vertical means at an angle of no more than about 10 degrees, more typically no more than about 7 degrees and most typically no more than about 3-5 degrees off of true vertical. It is desirable to mount the rods as vertical as practical. The rods are adjustably mounted on a support member that usually runs perpendicular to the direction of the cooling members, but that can run parallel or at an angle with the cooling members. The support member is located at an elevation that is substantially lower than a tip plate of the bushing. By substantially lower is meant low enough to provide a length of rod that allows the rod to be easily bent or that allows the cooling member to be tilted the desired amount. Typically, each cooling member is supported by two generally vertical rods, but can also be supported by a single rod. By generally laterally is meant laterally even though the top of the cooling member may be moved a greater distance laterally than the bottom of the cooling member. The cooling members are designed to carry a cooling liquid or gas. Air is a gas and water is a liquid, but other gases and other liquids can be used.

The invention also comprises a process of making fiber from a molten material by flowing the molten material into a fiberizing bushing having at least one generally vertical side wall, an orifice plate having holes therein or a tip plate having a plurality of tips thereon, each tip having an orifice therethrough that communicates with the molten glass in the bushing and with the environment external of the bushing, causing the molten material to flow through the orifices in the orifice plate or in the tips whereby a meniscus is formed below each operative orifice or tip and pulling a fiber from each meniscus, cooling the molten glass meniscus and just formed fibers using a plurality of cooling members held in place below the orifice plate or tip plate with a mounting apparatus for mounting the plurality of cooling members, the improvement comprising one or more mechanisms on the mounting apparatus to allow vertical adjustment of each cooling member with respect to the orifice or nozzle plate independently from other cooling members, each cooling member being supported with one or more generally vertical and bendable rods, and adjusting the temperature profile of the orifice plate or tip plate by adjusting the vertical spacing between each end portion of each cooling member and the bottom of the orifice plate or tip plate and/or by bending one or more of the bendable rods to adjust the one or more cooling members laterally. The support rods can have any reasonable cross sectional shape, at least in the unthreaded portion, and are made from a metal that is easy to bend in the hot atmosphere below the fiberizing bushing and are made of a metal that resists corrosion in this very corrosive environment.

When the word "about" is used herein it is meant that the amount or condition it modifies can vary some beyond that stated so long as the advantages of the invention are realized. Practically, there is rarely the time or resources available to very precisely determine the limits of all the parameters of ones invention because to do would require an effort far greater than can be justified at the time the invention is being developed to a commercial reality. The skilled artisan understands this and expects that the disclosed results of the invention might extend, at least somewhat, beyond one or more of the limits disclosed. Later, having the benefit of the inventors disclosure and understanding the inventive concept, the objectives of the invention and embodiments disclosed, including the best mode known to the inventor, the inventor and others can, without inventive effort, explore beyond the limits disclosed using only ordinary skill to determine if the invention is realized beyond those limits, and when embodiments are found to be without any unexpected characteristics, those embodiments are within the meaning of the term about as used herein. It is not difficult for the artisan or others to determine whether such an embodiment is either as expected or, because of either a break in the continuity of results or one or more features that are significantly better than reported by the inventor, is surprising and thus an unobvious teaching leading to a further advance in the art.

DETAILED DESCRIPTION

Figure 1:
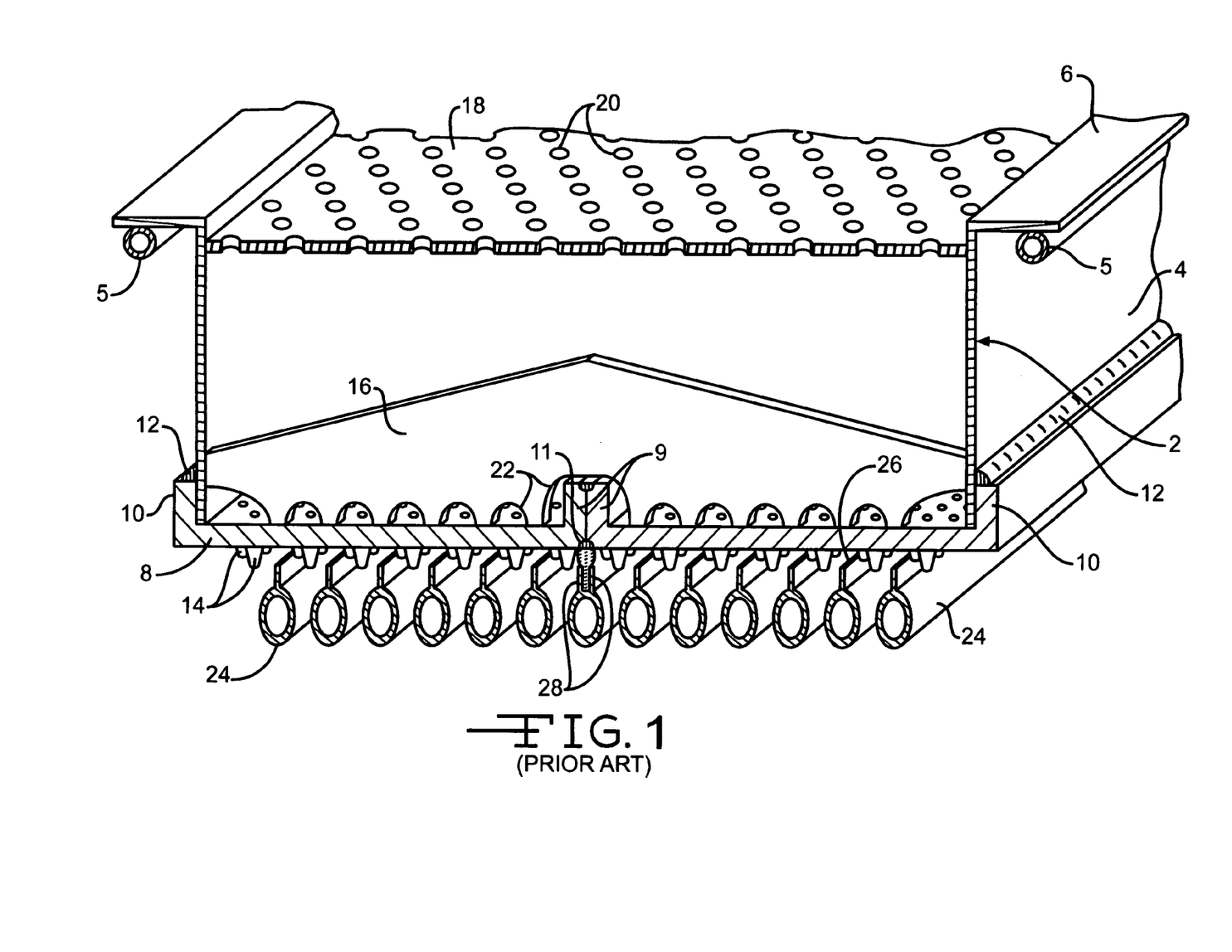
FIG. 1 is a crossectional partial perspective view of a typical prior art bushing showing cooling members mounted beneath the fiberizing bushing.

FIG. 1 is a cross-section through the width of a typical precious bushing 2 and related hardware used to form glass fiber from molten glass. The bushing is made from platinum/rhodium alloy having a rhodium content ranging from ten to about thirty percent, typically 20-22 percent. The bushing 2 comprises two sidewalls 4, a flange 6 that extends around the entire upper periphery of the bushing and that is welded to the upper edges of the sidewalls 4 and the upper edges of two end walls (not shown), an orifice plate 8 having turned up sides 10 for welding to the sidewalls 4 with weld 12, a plurality of orificed tips 14 welded to or formed from a tip plate 8, a plurality of internal supports 16, and a perforated plate or screen 18 having a plurality of openings 20 therein. The tip plate 8, that can be just an orifice plate with out tips or with tips surrounding orifices in the orifice plate, in the bushing shown is usually made in two or more sections and welded together down the center 11. To strengthen this weld, the inside portions of the tip plate 8 are also turned up along their inside edges to form vertical sections 9. The outer side edges of the tip plate 8 are also turned up to form short vertical sections 10 for welding to the sidewalls 4. The tip plate 8 is further strengthened with a plurality of interior supports 16 spaced along the length of the bushing with only their bottom edges attached to the bushing, usually welded to the top surface of the tip plate 8 between the rows of tips 14. The internal supports can have cutouts 22, where needed above the orifices so as to not impede the flow of molten glass into the orifices. The outer or side edge portions of the orifice plate 8 are also bent up to vertical and are attached to usually thinner sidewalls 4 with a weld 12.

The upper portions of the sidewalls 4 can be bent out to form flanges 6. When the bushing is installed, the upper surface of the flange 6, which extends uninterrupted entirely around the upper periphery of the bushing, will contact, and be held against, with a well known mounting frame 38 shown in FIG. 2, a refractory surface around an orifice in the bottom of a forehearth of a furnace. A water cooled coil 5 is also held against the lower surface of the flange 6 to freeze any molten glass attempting to flow between the refractory and the flange thus forming a glass tight seal. Orificed tips, nozzles, 14 that permit molten glass to flow there through to form fibers are formed or attached to the orifice plate 8 before the bushing 2 is assembled in any one of several known methods, such as by extrusion from the orifice plate 8 followed by drilling orifices entirely through the tips 14 and the tip plate 8, by welding tubular tips into holes in the tip plate 8, etc. Normally, tips are arranged in rows down the length or along the width of the bushing. In the bushing shown in FIG. 1, the tips 14 are arranged in pairs of rows staggered, running along the length of the bushing in a known manner, e. g. as shown in U.S. Pat. No. 4,337,075.

A space is left on the bottom of the orifice plate in between each double row of tips to allow cooling members such as cooling tubes 24, each with or without a heat removing fin 26 attached to their top surface. A tremendous amount of heat must be removed from the molten glass extruding from the tips 14 at over 2000 degrees F. very quickly and the water cooled tubes 24 with their fins 26 perform this function, supplemented by a flow of air pulled into the area of the tips and fibers by the glass fibers moving rapidly away from the tips 14. Although cooling tubes are not shown on the outside of the outer double rows of tips, it is sometimes preferred to use cooling tubes with single fins in those positions also such that each row of tips is adjacent to a fin and cooling tube and adjacent, but staggered, to another row of tips.

The center cooling tube differs from the other cooling tubes in that it has two fins 28 on its top surface. Fitted between the two fins 28, as will be shown later in more detail, is a ceramic support 11 that contacts the bottom of the orifice plate 8 beneath the weld and runs down the entire length of the bushing to further support the orifice plate 8. The cooling tubes are supported in a well known manner, such as disclosed in U.S. Pat. No. 5,244,483. While the cooling tubes shown here are rectangular in cross-section, they can be oval, round, square, rectangular with radiused ends, etc. as is well known.

Figure 2:
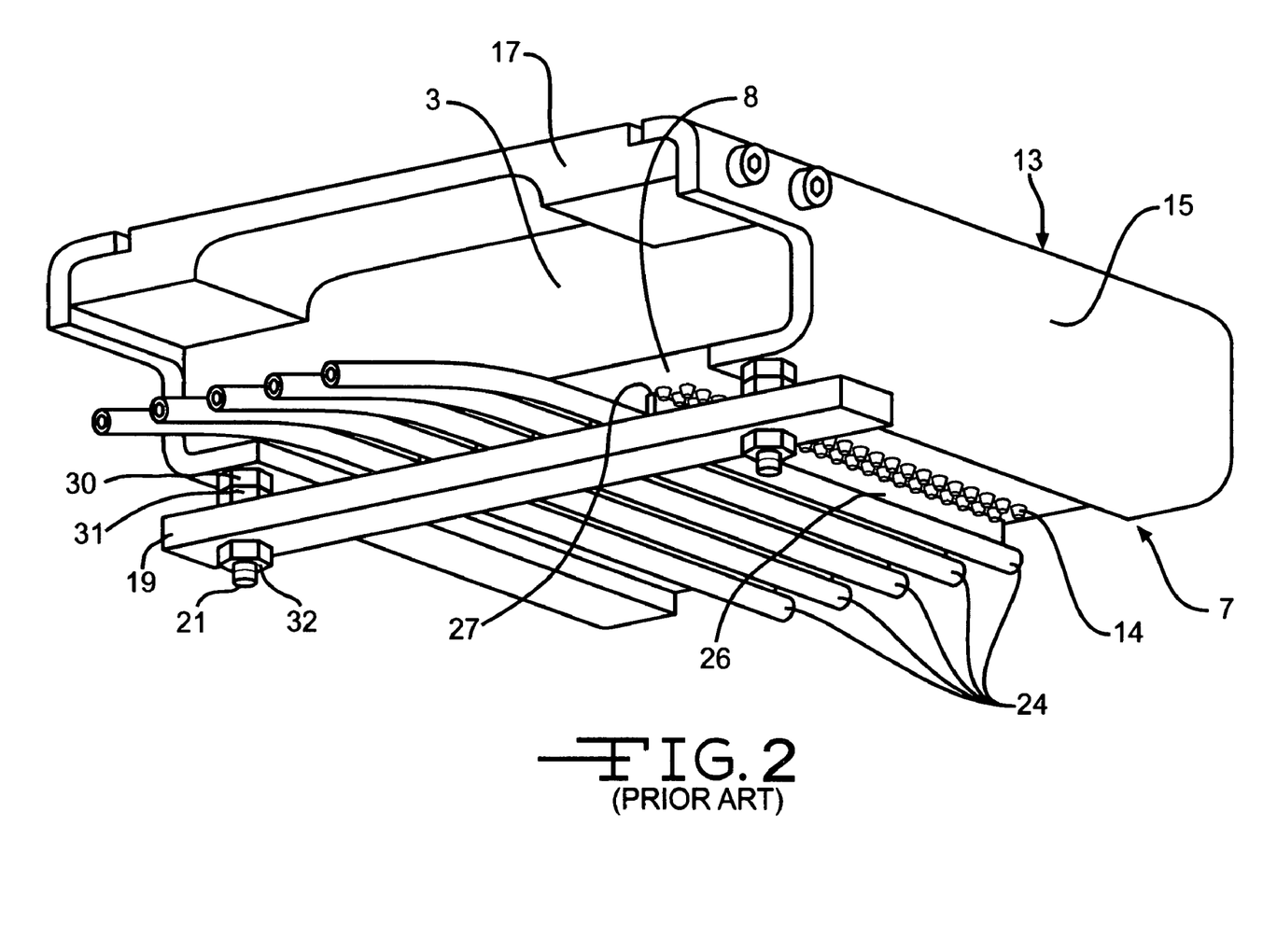
FIG. 2 is a partial perspective view of a conventionally mounted bushing assembly including a conventional cooling member positioning apparatus.

FIG. 2 shows a portion of a mounted bushing assembly 7 having a different design bushing 3 mounted and equipped with cooling members 24 and a cooling member 24 support and adjustment system ready to be installed beneath an orifice of a forehearth leg. Some of the cooling tubes 24 have been left off of this figure to better show the tips 14 and the orifice plate 8. The bushing 3, because of its very hot and fairly fragile nature at operating temperature, is surrounded with insulation in a known manner inside a corrosion resistant metal, such as stainless steel, or other metal mounting frame 13 having side members 15 and cross members 17. The cooling tubes 24 are held in place at each end portion 25 of each cooling tube 24 near each end of the bushing 3 with a support bar 19 that can be adjusted vertically. The end portion 25 of each cooling tube begins in a plane of each end plate 7 or below and just beyond tips 14 at the ends of the tip rows and extends away from the end of the bushing for up to several inches, typically for 0.5-5 inches, but can extend a greater distance. Threaded rods 21 are welded to, or screwed into threaded holes in, the bottom of the side members 15 and a lock nut 30 is tightened against the bottom of the side member 15 to lock and support the threaded rod 30 in place. An adjustable stop nut 31 on the threaded rod 21 is positioned at a desired level to locate a top 27 of the fins 26 at the desired position with respect to the tips 14 and the orifice plate 8. Then a follower nut 32 is turned to raise a top of the support bar 19 tightly against the adjustable stop nut 31. This arrangement permits the cooling tubes to be raised or lowered as a group to optimize the cooling of each tip 14, each hot meniscus below each tip 14 and each fiber being drawn from each meniscus. This arrangement has been used for years and performs adequately during the early part of the life of the bushing, but looses most of it adjustment function during more the half of the normal life of the bushings.

During several months of continuous operation, the orifice plate or tip plate 8 becomes deformed, sags with the maximum sag being in the center portion of the tip plate 8, due to hot creep of the precious metal. When that happens one or more rows of tips 14 often become cocked towards one side of the bushing 3. The above conventional cooling tube 24 and cooling tube fin 26 adjusting system does not allow optimum compensation for these orifice plate or tip plate 8 deformations. Since the deformation is not uniform across the tip plate 8, adjusting the cooling members 24 as a group does not address the problems caused by the sagging and uneven sagging problem. This often is the reason for the end of the effective life of the bushing.

Figure 3:
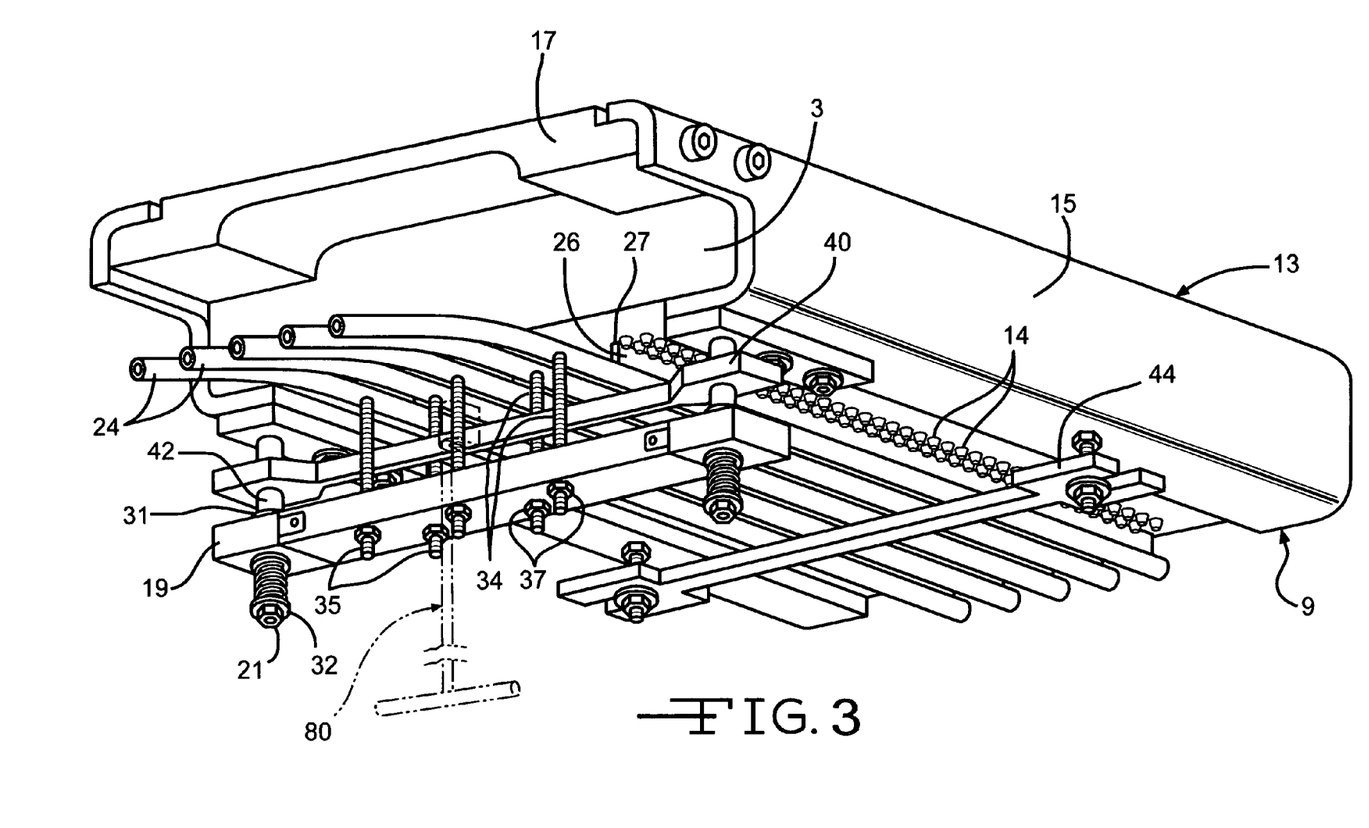
FIG. 3 is a partial perspective view of the bushing mount assembly of FIG. 2, but having the cooling member adjustable support system of the invention.

FIG. 3 shows a mounted bushing assembly 9 that is similar to the mounted bushing assembly 7 of FIG. 2, but the mounted bushing assembly 9 has a modified cooling tube support and adjustment system built according to the invention, i.e. is one embodiment of the invention, that permits vertical and lateral adjustment of each cooling tube 24 and fin 26 to compensate for the sag of the orifice plate or tip plate 8. This embodiment also permits each cooling tube 24 and fin 26 to be cocked or tilted with respect to vertical to compensate for cocked rows of tips 14. This embodiment also comprises the optional adjustment of each end portion of each cooling tube 24, but this optional feature is not required. While only one end portion of the mounted bushing assembly 9 is shown in this figure, the end portion of the other end of the bushing of said assembly 9 not shown looks the same as the end portion that is shown. This embodiment has the optional threaded rods 21, adjusting nuts 32 and the support bars 19 as in FIG. 2, allowing the cooling members to be adjusted vertically as a group. But in this embodiment the support bars 19 do not contact the cooling members 24 directly, but instead support threaded adjusting rods 34 (TAR).

One end of each TAR 34 is attached, such as being brazed, welded or silver soldered to the underneath side of each cooling tube 24 at a location that is usually laterally outboard of, but near, each end of the bushing 3. If the tips 14 do not extend all the way to the end of the bushing, the area where the TAR 34 is soldered to the bottom of the cooling member 24 can be inboard of the end of the bushing 3, but not such as to interfere with fibers coming from the tips 14. By near is meant within about 1 inch of the end of the bushing 3. In the embodiment of FIG. 3, the other end of each TAR 34 has a threaded portion that can extend the entire length of the TAR 34, or only an end portion 35 that is adjacent to the end opposite the end attached to the cooling member 24. The threaded end portion 35 of each TAR 34 passes through a hole in the support bar 19, these holes having a diameter slightly larger than the diameter of each TAR 34 to allow each TAR 34 to move easily and vertically inside the hole to move the cooling members 24 up or down generally vertically. A lower adjusting nut 37 and an upper adjusting nut 39 (see FIG. 5) on each TAR 34 are rotated in the proper direction, and to the proper amount, to cause the cooling member attached to that TAR 34 to move either upward or downward as desired and to the desired extent. A first, optional, air tube support bar 40 is supported by the threaded rods 21, adjusting nuts 32 and spacers 42 of desired heights. A second optional air tube support bar 44 is located about 25 percent of the bushing length from the end of the bushing 3 and are held in proper vertical position by a threaded stud 54 (see FIG. 4) passing through a slot 56 in each end of the support bar 44 and with a nut 58 threaded onto the threaded stud 54 to snug against the face of the support bar 44. Third and fourth optional air tube support bars 44 (not shown) can be located at mid-length and three quarters length. The full function of the support bars 44 will become more apparent in the description of FIG. 6 below.

Figure 4:
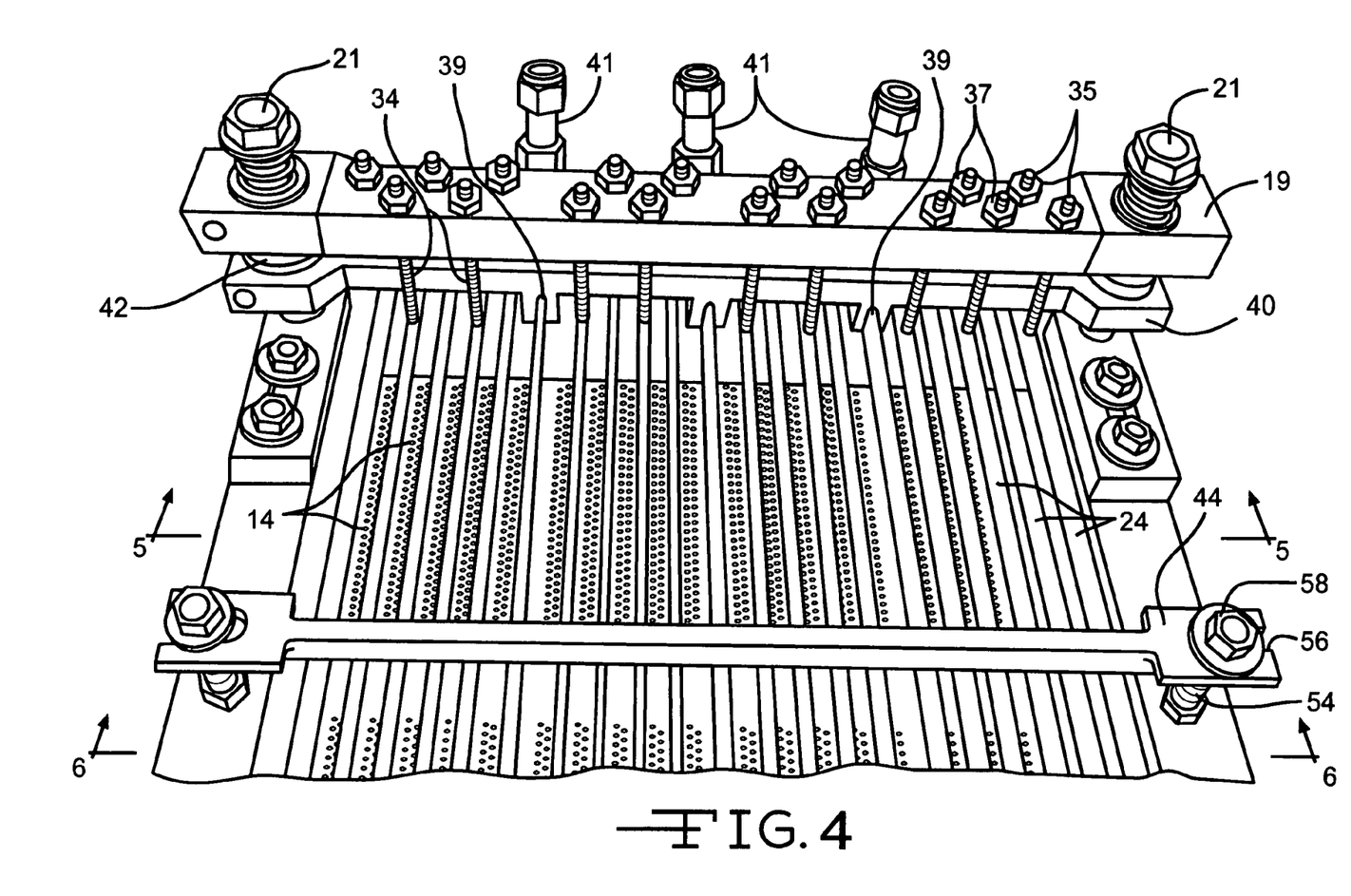
FIG. 4 is a partial perspective view of the bottom of the bushing mount assembly and cooling member support system shown in FIG. 3.
Figure 5:
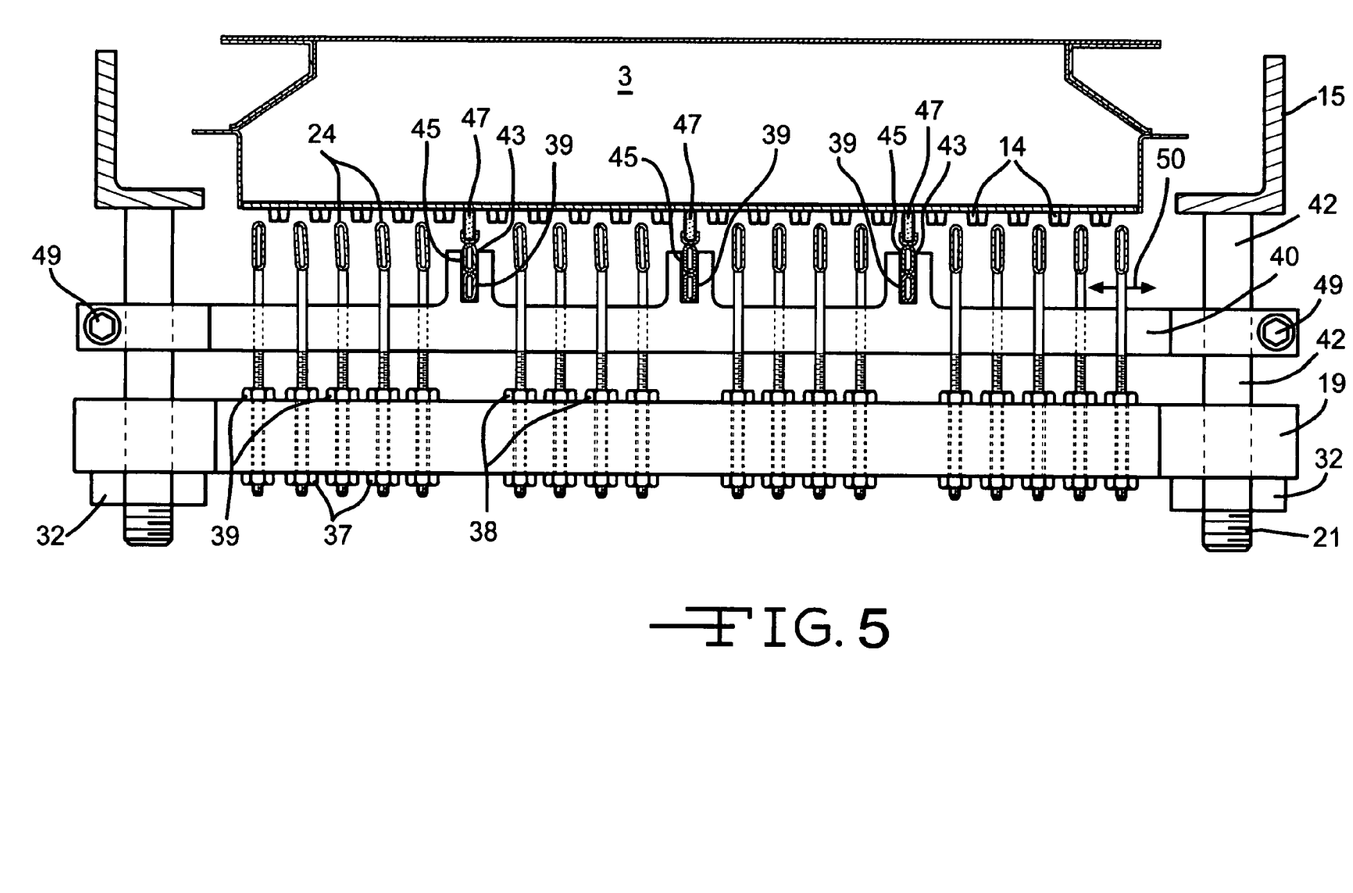
FIG. 5 is a cross section along lines 5-5 of FIG. 4 and showing a view of one end of the bushing mount assembly and one embodiment of the cooling member support system of the invention.

FIG. 4 is a perspective view of the bottom of the bushing mount assembly 9 shown in FIG. 3 as seen from beneath the bushing and looking towards the end portion of the bushing. This view adds detail the embodiment of the cooling member 24 support system of the invention shown in FIG. 3. In addition, this view shows three air tubes 39 spaced apart across the bushing with still more detail shown in FIG. 5. The air and/or support tubes 39 are supported by the air tube support bar 42 as shown, and in turn the tip plate 8 of the bushing 3 and better shown in FIG. 5. The air tubes 39 are used to induce a downward flow of air, usually following a breakout of the bushing 3, as described in U.S. Pat. No. 4,662,922, the disclosure of which is incorporated herein by reference. Air is fed to the air tubes 39 with air feed tubes 41 (FIG. 4). Mounted on top of each air tube 39 is a fluid cooled tube 45, usually water cooled, that remains in a fixed position to cool the air tube to prevent sagging of the air tube. Mounted on top of each fluid cooled tube 45 is a strip 47 of ceramic refractory material, in contact with the bottom of the orifice or tip plate 8 for support of the bushing, as described in one of the prior art patents mentioned above. This manner of supporting the orifice or tip plate 8 is fairly effective, in the areas supported directly, but those areas between the refractory strips 47 still sag with operating cumulative time. Normally the air tube support bar 40 is clamped in place on the threaded rods 21 by tightening the nuts 49 during the entire life of the bushing 3, but can be loosened and lowered or removed if it becomes necessary to replace one of the air tubes 45, fluid cooled tubes 47 or refractory strips 49 during the life of the bushing. In addition to the vertical adjustment of one or more of the cooling members 24 by appropriate rotation of the appropriate nuts 37 and 38, the TAR 34 can be bent as shown at 50 to move the attached cooling member 24 generally laterally and to slightly tilt the cooling member 24. One advantage of this embodiment is that a TAR 34 is attached to each end portion of each cooling member 24. In this manner, if one end portion of the orifice or tip plate 8 sags at a different rate that the other end portion, the cooling members 24 can be adjusted to compensate for this by lowering one end of the cooling member 24 more than the other end.

Figure 6:
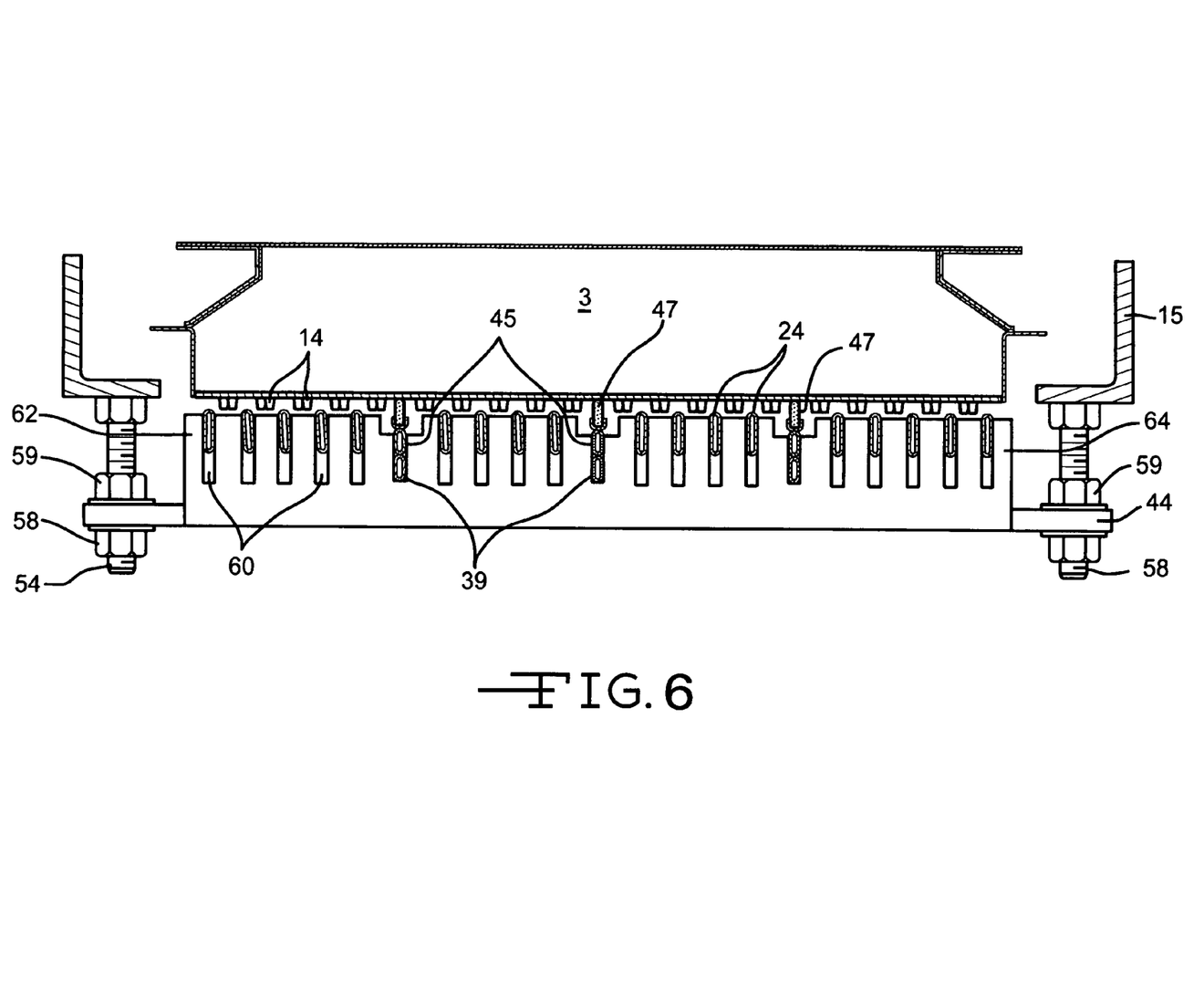
FIG. 6 is a cross section along lines 6-6 of FIG. 4 showing an air tube support and cooling member guide that also limits the lateral movement and/or the degree of tilt of the cooling members.

FIG. 6 shows another function of the optional support bars 44, that of providing a limit to the lateral movement and tilt angle of the cooling members 24. A plurality of spaced apart, vertically oriented slots 60 in an upper portion of the optional support bars 44, each slot being about 0.01+/− about 0.008 inch wider than each cooling member 24, prevents excessive lateral movement of and also excessive tilting of each cooling member 24, preventing any cooling member 24 from being moved into contact with one or more tips 14 or from being moved into a meniscus of molten glass or the path of one or more fibers coming from the tips 14. Most typically, the vertical center line of each slot 60 aligns with the desired beginning center line of each cooling member 24 that will occupy each slot 60. The outer part 62,64 of the two end slots, one on each end of the plurality of spaced apart slots 60, is optional and need not be there, but typically is as shown in FIG. 6. Note that the optional support bars 44 can also support the air tubes 39, the cooling fluid tubes 45 and the refractory strips 47, adding additional support for the tip plate 8 if desired. The optional support bars 44 are adjusted to the desired distance from the bottom surface of the orifice or tip plate 8 by rotating nuts 58,59 appropriately. Typically, at least one optional support bar 44 is used below the mid-length of the bushing 3 and when only one of said bars 44 is used, it contains the optional slots 60. It is more typical to use three of the optional support bars 44, one under each quarter-length of the bushing 3. In the latter embodiments, only the optional support bar 44 at mid-length need contain the slots 60, but all of the optional support bars 44 can contain the plurality of slots 60. In other embodiments of the invention, only one TAR 34 is used per cooling member.

Figure 11:
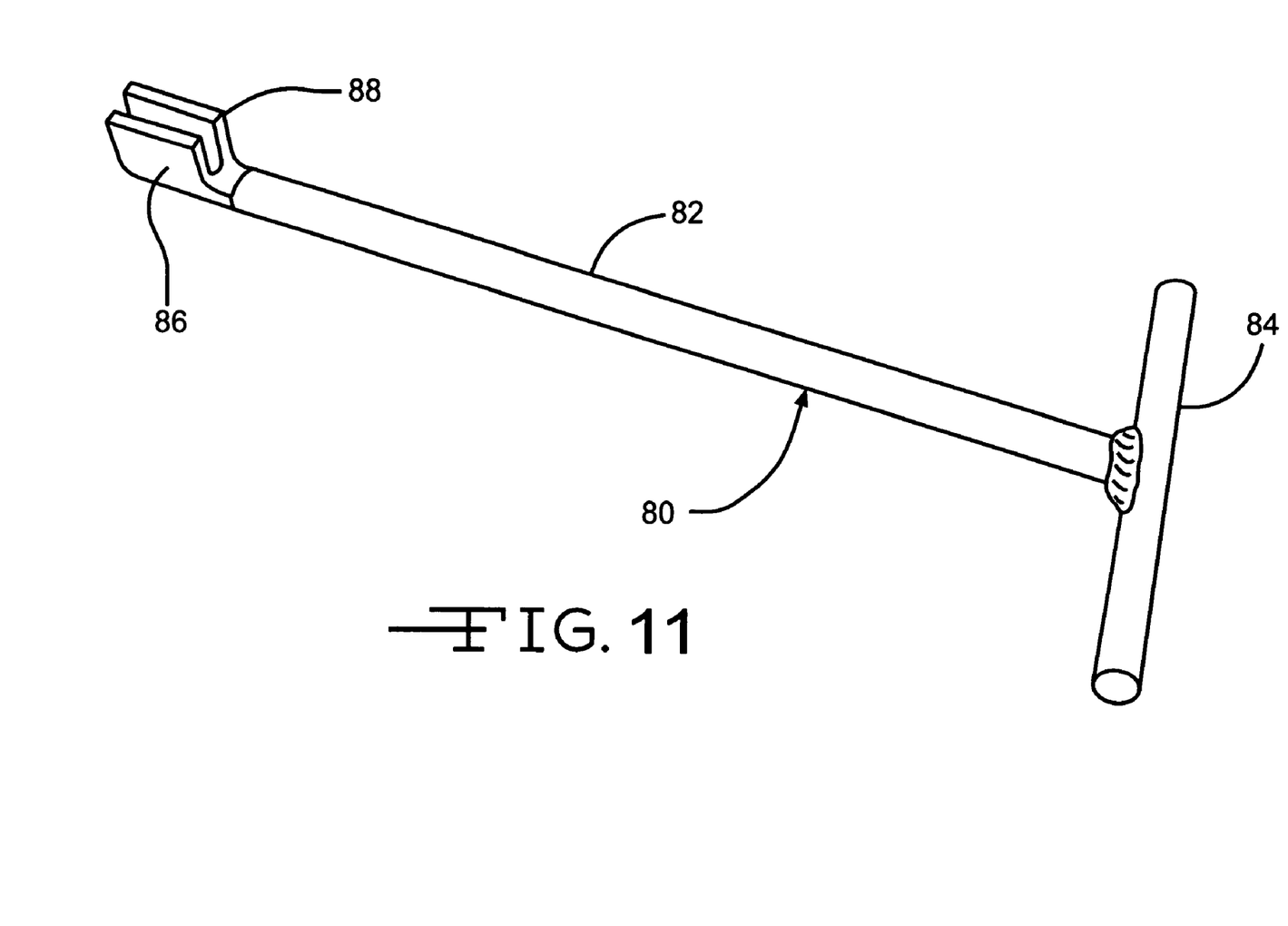
FIG. 11 is a perspective view of a tool that is optionally used with the invention.

FIG. 11 shows a tool 80 used to make a lateral and/or tilting adjustment to at least one end portion of a cooling member 24. This tool 80 is comprised of a handle 84 integral with or connected to an extension arm 82. The extension arm 82 is typically of a length that an operator can stand on the floor of the forming room and reach the TAR 34 with an engaging member 86 mounted on the end of the extension arm 82, as shown in FIG. 3. A slot 88 in the engaging member 86 surrounds on three sides a TAR 34, and using the handle 84 alone, or with the extension arm 82, the TAR 34 can be bent to tilt and/or laterally move the cooling member 24 attached to the engaged TAR 34 the desired amount.

Figure 7:
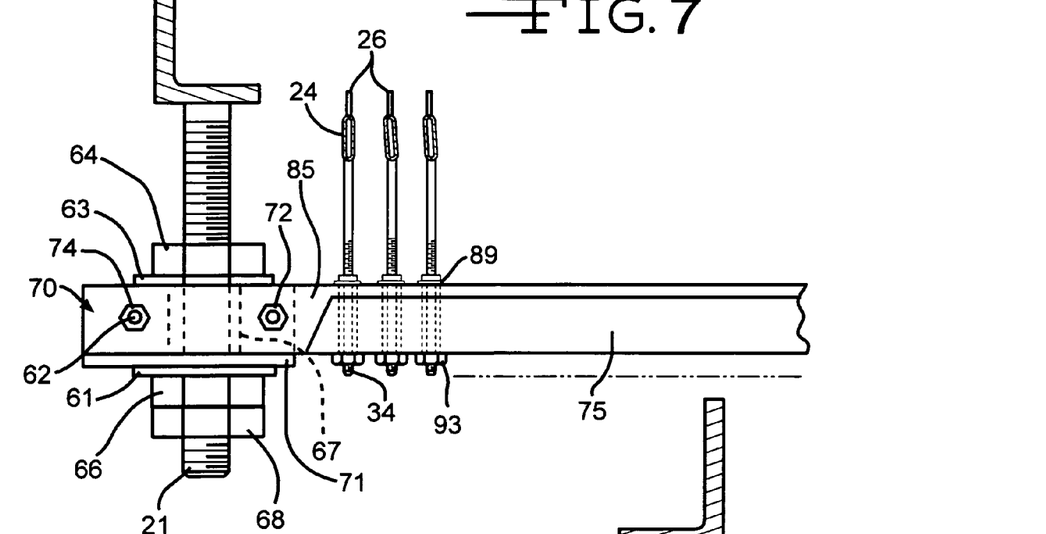
FIG. 7 is a partial end view of another embodiment of the invention.
Figure 8:
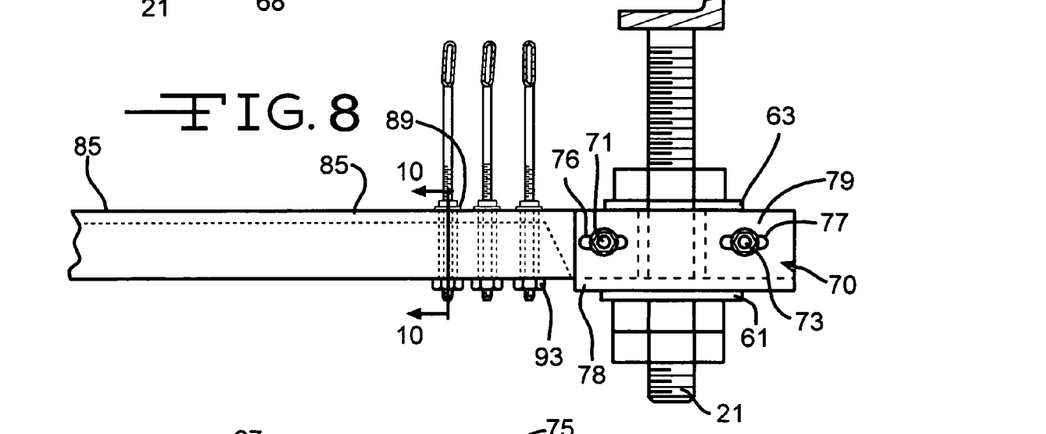
FIG. 8 is a partial end view of the embodiment shown in FIG. 7, but from an opposite direction.
Figure 9:
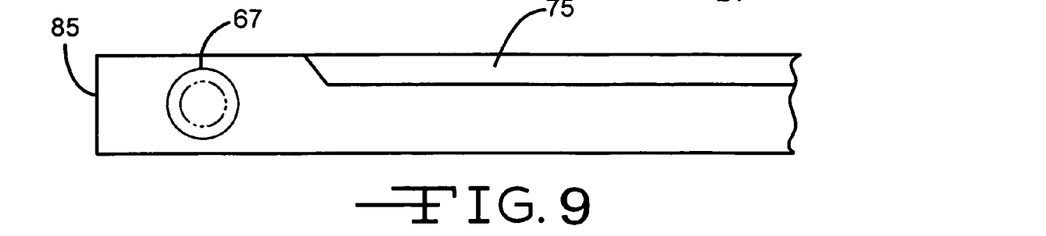
FIG. 9 is a partial bottom view of one element of the embodiment shown in FIGS. 7 and 8.

FIGS. 7-10 disclose other embodiments of the invention that are modifications of the embodiment shown in FIGS. 3-6 and described above. FIG. 7 is a partial view of the arrangement shown in FIG. 5, but modified according to another embodiment as follows. First, a modified support bar 85 can be optionally relieved in an area 75 to provide more clearance for the array of fibers coming from the tips 14. Second, the support bar 85 can be optionally mounted on a support 70 such that the support bar 85 can be moved laterally. This is helpful at times to move all of the cooling members 24 at the same time a desired direction and a desired distance. One such time is when the arrangement is being assembled cold and then adjusted to place the cooling members 24 in the proper location relative to the rows of tips 14, and again after the bushing 3 has been heated up to operating temperature. Because of the different materials used for the different parts, such as the frame 15, the bushing 3 and the cooling members 24, adjustment is usually required before fiberization begins or soon afterward and often all of the cooling members 24 require the same type of adjustment. This is achieved by making the hole 67 in the support bar 85 larger than the diameter of the threaded rod 21 and by slideably supporting the support bar 85 at each end with an end support 70 having a horizontal part 78 and one or more vertical parts 79. The horizontal part 78 comprises a hole for the threaded rod 21 permitting the end support 70 to be held in place vertically with an optional washer 61, a nut 66 and an optional locking nut 68, all surrounding the threaded rod 21 and is fixed from moving vertically upward more than desired by a second optional washer 63 and a stop nut 64. The vertical portion 79 of the end member 70 is shown in one piece, but can be much shorter, and can be in two or more parts if desired. The one or more vertical portions 72 of the end member contains at least one horizontal slot 76, and in the embodiment shown has a second optional slot 77. The support bar 85 has one or more horizontal holes near each at least one end portion for one or more tightening members, like one or more bolts 71,73, which with one or more nuts 72,74, can secure the support bar 85 against lateral movement when the nut(s) 72,74 are tightened on the bolts 71,73. It is possible to use only one bolt on one side 71 or 73 to secure the support bar 85 against further lateral movement, but more can be used, such as two bolts 72,73 on one end portion or on both end portions of the support bar 85. Thus, when the bushing 3 has been heated in a conventional manner to operating temperature, the spacing between the cooling members 24, with or without fins 26, will be checked and if different than desired, and if similar for all or most of the cooling members 24, than the nut(s) 71 and or 73 are loosened and the support bar 85, and everything attached thereto, are moved laterally the necessary distance to achieve the desired spacing. Any vertical adjustment needed can be achieved by loosening the lock nut(s) 68 and moving the stop nut 64 and adjusting nut 66 appropriately to move the cooling members 24, as a group, up or down and then securing each end of the vertical bar support 85 by retightening the lock nut 68 against the adjusting nut 66.

Figure 10:
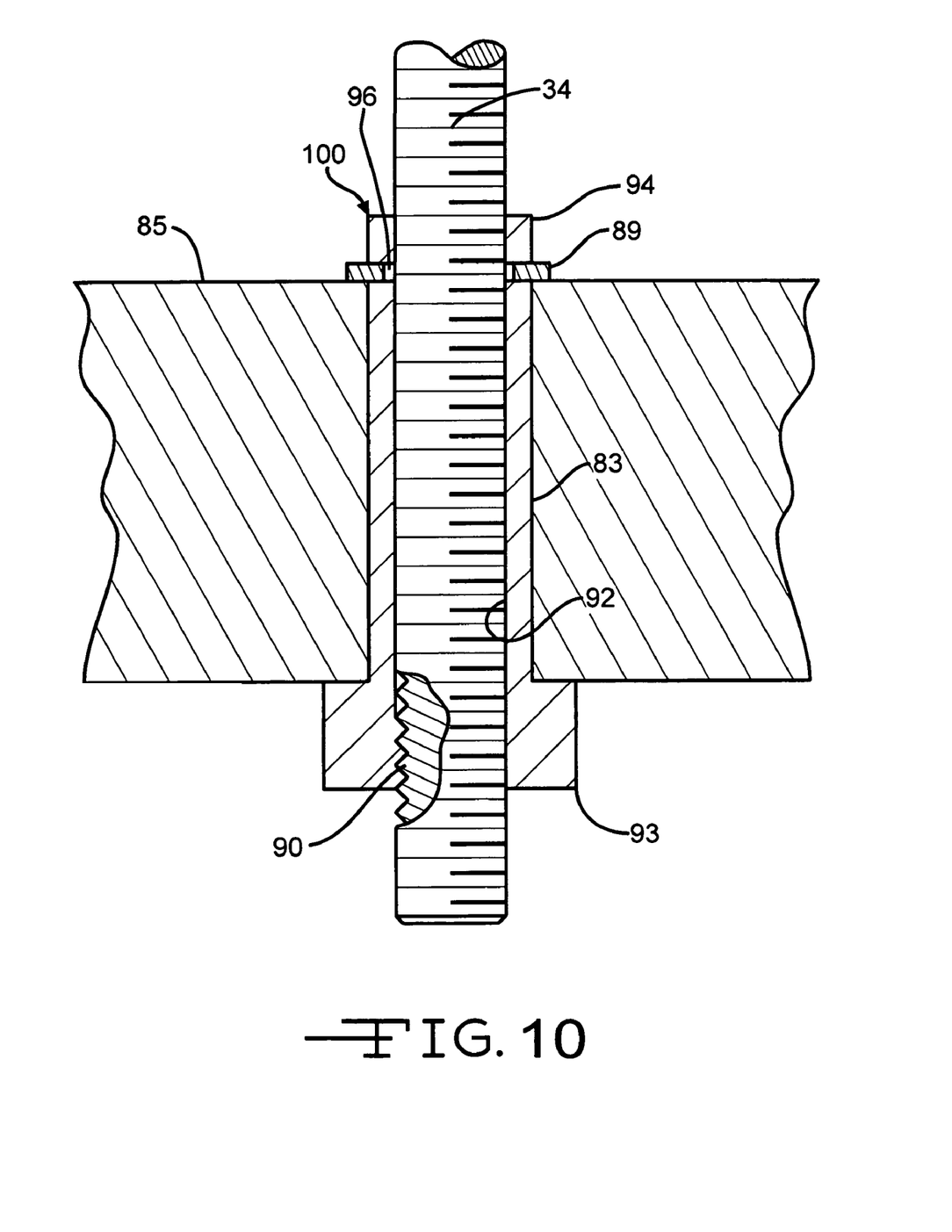
FIG. 10 is an enlarged view of a portion of the embodiment shown in FIGS. 7 and 8.

FIGS. 7-10 also show an improved adjusting device 100 for each TAR 34 attached to the cooling members 24, best shown in FIG. 10. Each adjusting device 100 mounts in a hole 83 in the support bar 85. The adjusting device 100 has an outer diameter slightly smaller than the diameter of the hole 83 so it can be easily rotated in the hole 83. The adjusting device, like a ferrule nut 100 having a smooth, round passageway 92 through most of its length with the lower portion 90 threaded to engage the threads on the TAR 34. The smooth portion of the passageway 92 has a diameter slightly larger than the outside diameter of the TAR 34. A lower portion 93 of the adjusting ferrule nut 100 is typically hexagonal in cross section, but can be square, rectangular, triangular or other shapes, and has an outside diameter larger than the hole 83. Most typically, a plan view of the bottom of the lower portion 93 and the TAR 34 would look the same as shown in FIG. 4 for the nuts 37 and TARs 34. The adjusting ferrule nut 100 preferably has a slot 96 completely around its circumference spaced from a top edge 94 of the adjusting ferule nut 100 for the purpose of containing a removable retainer such as a snap ring 89 to hold the adjusting ferrule nut 100 in place on the support bar 85. Instead of the removable snap rings 89, the removable retainer could also be a removable pin passing through the rod contacting adjusting device 100 as is well known (not shown). The location of the slot 96 is such as to make the distance between a bottomsurface of the snap ring 89 to the top of the bottom portion 93 slightly greater than the thickness of the support bar 85 so that the adjusting ferrule nut 100 can be turned freely during hot operation. The adjusting ferrule nut 100 permits the operator to easily and quickly adjust the vertical position of the cooling members 24 without having to get close to the hot bushing 3, using an extended, long, nutdriver and by having to turn only the lower portion 93 of the adjusting ferrule nut 100. The adjusting ferrule nut 100 used in combination with the TAR 34 and the support bar 85 greatly improves the likelihood that the cooling members will be adjusted property and timely when needed, and therefore significantly improves fiberizing efficiency, i.e. percentage of the time that the bushing 3 is making good fiber product, as opposed to "hanging", i.e. running coarse primary scrap fibers into the waste system.

To assemble the cooling member assembly normally the first step is to insert the adjustor ferrules 100 into the support bars 85 and lock them into place with the snap rings (89). The cooling tubes 24 (all) are then installed in the bars by inserting the TARs 34 in the ferrules 100. The cooling member assembly is then turned over and the end portion 93 of each ferrule 100 is screwed onto the TAR by turning them with a nut driver or electric screw driver, until the end of each TAR extends below the bottom of the end portion 93 of the ferrule, typically up to about one inch.

The next step is to level all of the cooling tubes. This is done by placing the entire assembly on a flat surface with the cooling tubes 25 resting on the flat surface. A spacer, normally about 1⅞ inch thick is placed under each end of each adjuster bar 85, lifting the cooling tubes off the flat surface. Each cooling tube 24 is then lowered by adjusting each ferrule 100 until the cooling tube, 24 or fin 26, just touches the flat plate. After repeating on all of the cooling tubes 24, all of the top surfaces of the tubes 24, or fins 26, in the same plane.

The entire cooling member assembly is then attached to the bushing frame 13 with using the threaded rods 21 and the nuts as shown in FIG. 3 or FIG. 7. Next the desired tube 24 or fin 26 to tip 14 distance is set by placement of the stop nuts 64 on the threaded rods 21, snugging up the adjuster nuts 32 or 66 and then snugging up the optional locking nuts 68, when used, against the adjuster nuts 32 or 66. Next the TARs are bent where needed, or the support bars 85 are adjusted laterally, to center the fins 26, or cooling tubes 24, between the adjacent rows of tips 14. Then, the nuts 72, 74 and the adjustor nut 61 are tightened to lock things in place. Any of the cooling members 24 that are not in proper alignment can be nudged into place with alignment using the tool 80 to bend the TARs 34. The bushing assembly 9 is now ready for installation and heat up.

The adjustor nuts 32 or 61 remain tight against the support bars 19 or 85 during installation to prevent the cooling member assembly from moving while the bushing assembly 9 is being installed in a fiber forming position. After installation, the adjustor nuts 32 or 61 are loosened to a light snug and then locked in place with the locking nuts 68 before heating up the bushing 2. This arrangement allows the cooling tube assembly to float longitudinally while the bushing 2 and bushing frame 13 undergo thermal expansion due to the large temperature increase to about 1900 degrees F. or higher.

After this the adjustor nuts 32 or 64 and the locking nuts 31 or 61 are normally not changed further during the life of the bushing 2, and the cooling member assembly is allowed to move with any thermal changes. The reason for this is the bushing frame heats up with the bushing but the cooling tubes stay relatively cool and do not expand because they remain at or near the temperature of the cooling water or other fluid. Without this movement, a stress would be put on the cooling member supports causing the cooling members to warp and cause fiberizing problems.

After the bushing 2 is up to temperature, a final check of cooling member alignments is made and the TARs 34 are bent with the tool 80 where required. No further cooling member 24 vertical adjustments are made until the tip plate 8 has begun to sag or a hot spot develops in an area of the tip plate 8. Desirably, the TARs have a 10-24UNC threads (90) which means one turn of the ferrule 100 will move the cooling tube 1/24 inch or approximately 0.041 inches. Using this relationship allows making fine adjustments of the cooling members 24. Most vertical adjustments are made using ⅛ turn increments of the bottom portion 93, but lesser to greater magnitude of turn increments can be used. Being able to adjust the cooling members easily, quickly and from a comfortable distance away from the furnace, compared to prior equipment and practice, results in more timely and more effective adjustment and significantly increased fiberizing efficiency and product productivity.

Different embodiments employing the concept and teachings of the invention will be apparent and obvious to those of ordinary skill in this art and these embodiments are likewise intended to be within the scope of the claims. The inventor does not intend to abandon any disclosed inventions that are reasonably disclosed but do not appear to be literally claimed below, but rather intends those embodiments to be included in the broad claims either literally or as equivalents to the embodiments that are literally included.

The invention claimed is:

1. An apparatus for adjusting the position of a plurality of individual cooling members carrying a liquid or gas and for cooling fiberizing tips, each individual cooling member being close to a row of tips and movable independently of the other cooling members in the plurality of cooling members, the plurality of cooling members mounted close to fiberizing tips on a tip plate of a fiberizing bushing, the apparatus providing for generally vertical movement of each of the plurality of cooling member independently of other cooling members of the plurality of cooling members to allow the maintaining of a desired spacing between each of the cooling members and the fiberizing tips closest to each individual cooling member as the tip plate or the orifice plate sags with use and time, the apparatus comprising     one or more supports to be located at a lower level than the fiberizing tips and/or the tip plate of the fiberizing bushing, the one or more supports having a function of supporting one or more adjusting rods,     the one or more adjusting rods having a threaded portion and being generally vertically movable and bendable by nudging and each of the one or more adjusting rods being attached to one of the plurality of cooling members and     a plurality of devices, one or more of the devices contacting each of said one or more adjusting rods and cooperating with the one or more supports to enable movement of each of said one or more adjusting rods generally vertically and to hold each of said one or more adjusting rods in position with respect to said support.

2. The apparatus of claim 1 wherein each of said adjusting rods is mounted to an end portion of a cooling member.

3. The apparatus of claim 2 wherein an end portion of said one or more adjusting rods is threaded.

4. The apparatus of claim 3 wherein each of a plurality of said adjusting rods passes through one of a plurality of openings in one of the supports.

5. The apparatus of claim 3 further wherein the devices contacting each of said adjusting rods cause or allow the generally vertical movement of said one or more adjusting rods when said devices are moved.

6. The apparatus of claim 5 wherein at least a portion of at least one of the adjusting rod-contacting devices resides in an opening in the one or more supports, extends above and below the top of the opening, is retained in the support by a removable retainer and moves the adjusting rod generally vertically when rotated.

7. The apparatus of claim 6 wherein the removable retainer rests on a top of the one or more supports.

8. The apparatus of claim 7 wherein at least one of the supports is secured against lateral movement with at least one securing member and is movable horizontally by loosening the at least one securing member, and when said support is moved, the cooling members as a group are moved laterally.

9. The apparatus of claim 6 wherein the removable retainer is a snap ring.

10. The apparatus of claim 6 wherein at least one of the supports is secured against lateral movement with at least one securing member and is movable horizontally by loosening the at least one securing member, and when said support is moved, the cooling members as a group are moved laterally.

11. The apparatus of claim 5 wherein at least one of the supports is secured against lateral movement with at least one securing member and is movable horizontally by loosening the at least one securing member, and when said support is moved, the cooling members as a group are moved laterally.

12. The apparatus of claim 3 wherein the devices are one or more movable adjusting rod contacting members on each of said rods and comprise one or more threaded nuts threaded onto the threaded portion of said adjusting rods.

13. The apparatus of claim 3 wherein at least one of the supports is secured against lateral movement with at least one securing member and is movable horizontally by loosening the at least one securing member, and when said support is moved, the cooling members as a group are moved laterally.

14. The apparatus of claim 2 wherein each of a plurality of said adjusting rods passes through one of a plurality of openings in one of the supports.

15. The apparatus of claim 1 wherein an end portion of said one or more adjusting rods is threaded.

16. The apparatus of claim 15 wherein each of a plurality of said adjusting rods passes through one of a plurality of openings in one of the supports.

17. The apparatus of claim 1 wherein each of a plurality of said adjusting rods passes through one a plurality of openings in one of the supports.

18. The apparatus of claim 1 wherein at least one of the supports is secured against lateral movement with at least one securing member and is movable horizontally by loosening the at least one securing member, and when said support is moved, the cooling members as a group are moved laterally.

19. A bushing assembly comprising a fiberizing bushing comprising at least one sidewall and a tip plate having a plurality of fiberizing tips on a bottom surface of the tip plate, the assembly also comprising a plurality of tip cooling members mounted below the tip plate, the improvement comprising an apparatus for holding and adjusting the position of each individual tip cooling member of the tip cooling members in the plurality of tip cooling members close to a row of tips, each individual tip cooling member movable independently of the other cooling members in the plurality of cooling members, to allow a desired spacing of each of the tip cooling members from the row of fiberizing tips closest to each tip cooling member as the tip plate sags with use and time, the apparatus providing for generally vertical movement of each tip cooling member independently of other tip cooling members in the plurality of tip cooling members, the apparatus comprising one or more supports located at a position lower than the fiberizing tips and the plurality of cooling members, the one or more supports having a function of supporting adjusting rods supporting the tip cooling members, each of the supports having openings the adjusting rods being generally vertically movable and bendable by nudging, each of the adjusting rods attached at one end to one of the tip cooling members in the plurality of tip cooling members and one or more devices for contacting and moving each of the adjusting rods generally vertically and for holding the adjusting rods in a fixed position with respect to one of said one or more supports.

20. The assembly of claim 19 wherein each of said adjusting rods is mounted to an end portion of a tip cooling member.

21. The assembly of claim 20 wherein an end portion of each of said adjusting rods is threaded.

22. The assembly of claim 21 wherein the one or more devices comprise one or more movable adjusting rod contacting members that when moved cause or allow the generally vertical movement of one or more of the adjusting rods.

23. The assembly of claim 22 wherein the one or more devices are movable adjustable rod contacting members and comprise one or more threaded nuts of a size to be threaded onto the threaded portion of said adjusting rods.

24. The assembly of claim 23 wherein at least one support is secured against lateral movement with at least one securing member and is movable horizontally by loosening the at least one securing member, and when said support is moved, the cooling members as a group are moved laterally.

25. The assembly of claim 22 wherein at least a portion of the adjusting rod-contacting members resides in an opening in the support, extends above and below a top of the opening, is retained in the support by a removable retainer and moves the adjusting rod vertically when rotated.

26. The assembly of claim 25 wherein the removable retainer is a snap ring.

27. The assembly of claim 26 wherein at least one support is secured against lateral movement with at least one securing member and is movable horizontally by loosening the at least one securing member, and when said support is moved, the cooling members as a group are moved laterally.

28. The assembly of claim 25 wherein the removable retainer rests on a top of the support.

29. The assembly of claim 25 wherein at least one support is secured against lateral movement with at least one securing member and is movable horizontally by loosening the at least one securing member, and when said support is moved, the cooling members as a group are moved laterally.

30. The assembly of claim 21 wherein at least one support is secured against lateral movement with at least one securing member and is movable horizontally by loosening the at least one securing member, and when said support is moved, the cooling members as a group are moved laterally.

31. The assembly of claim 20 wherein each of a plurality of said adjusting rods pass through one of the openings in the one or more supports.

32. The assembly of claim 19 wherein an end portion of each of said adjusting rods is threaded.

33. The assembly of claim 32 wherein each of a plurality of said adjusting rods pass through one of the openings in the one or more supports.

34. The assembly of claim 19 wherein each of a plurality of said adjusting rods pass through one of the openings in one of the one or more supports.

35. The assembly of claim 19 wherein at least one support is secured against lateral movement with at least one securing member and is movable horizontally by loosening the at least one securing member, and when said support is moved, the cooling members as a group are moved laterally.

* * * * *